United States Patent
Ogata et al.

(10) Patent No.: US 11,695,149 B2
(45) Date of Patent: *Jul. 4, 2023

(54) ISOSTATIC PRESS DEVICES AND PROCESSES FOR CYLINDRICAL SOLID-STATE BATTERIES

(71) Applicant: TeraWatt Technology Inc., Santa Clara, CA (US)

(72) Inventors: Ken Ogata, Kanagawa (JP); Yang Yang, Kanagawa (JP); Hajime Hoshi, Kanagawa (JP); Masatsugu Nakano, Kanagawa (JP); Hiroshi Imoto, Kanagawa (JP)

(73) Assignee: TeraWatt Technology Inc., Santa Clara, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 17/179,701

(22) Filed: Feb. 19, 2021

(65) Prior Publication Data

US 2021/0175534 A1    Jun. 10, 2021

Related U.S. Application Data

(63) Continuation of application No. 16/412,338, filed on May 14, 2019, now Pat. No. 10,957,935.

(51) Int. Cl.
  *H01M 10/04*    (2006.01)
  *H01M 10/643*   (2014.01)
  *B30B 3/02*     (2006.01)
  *B30B 15/34*    (2006.01)
  *H01M 10/48*    (2006.01)
  (Continued)

(52) U.S. Cl.
  CPC ......... *H01M 10/0422* (2013.01); *B30B 3/02* (2013.01); *B30B 15/34* (2013.01); *H01M 10/0404* (2013.01); *H01M 10/0468* (2013.01); *H01M 10/486* (2013.01); *H01M 10/643* (2015.04);
  (Continued)

(58) Field of Classification Search
  CPC ......... H01M 10/0422; H01M 10/0404; H01M 10/0468; H01M 10/486; H01M 10/643; H01M 2220/20; H01M 50/121; H01M 10/0431; H01M 10/0587; H01M 50/107; H01M 50/14; H01M 10/0409; H01M 10/0481; B30B 3/02; B30B 15/34; B30B 7/04; Y02E 60/10; Y02P 70/50
  See application file for complete search history.

(56) References Cited

U.S. PATENT DOCUMENTS 6,040,085 A     3/2000  Cheu et al.
10,218,033 B1   2/2019  Bhardwaj et al.
(Continued)

FOREIGN PATENT DOCUMENTS

WO    2010064217 A1    6/2010

OTHER PUBLICATIONS

International Search Report and Written Opinion dated Sep. 22, 2020 in related application No. PCT/US2020/032687, all pgs.

*Primary Examiner* — Cynthia K Walls
(74) *Attorney, Agent, or Firm* — Kilpatrick Townsend & Stockton LLP (57) ABSTRACT

Various arrangements for compressing a cylindrical battery cell are presented herein. The cylindrical battery cell may be wrapped in a buffer material. The buffer material may then be compressed using a compression mechanism. The buffer material may uniformly distribute pressure applied to the buffer material to a curved sidewall of the cylindrical battery cell.

20 Claims, 4 Drawing Sheets

(51) Int. Cl.
*H01M 50/121* (2021.01)
*H01M 50/14* (2021.01)

(52) U.S. Cl.
CPC ......... *H01M 50/121* (2021.01); *H01M 50/14* (2021.01); *H01M 2220/20* (2013.01)

(56) References Cited

U.S. PATENT DOCUMENTS

2004/0205959 A1 10/2004 Honda
2013/0136967 A1 5/2013 Bhardwaj et al.

FIG. 4 ial, whereby the cylindrical battery cell is now a
semi-activated cylindrical battery cell.

ISOSTATIC PRESS DEVICES AND PROCESSES FOR CYLINDRICAL SOLID-STATE BATTERIES

CROSS-REFERENCES TO RELATED APPLICATIONS

This application is a continuation of U.S. patent application Ser. No. 16/412,338, entitled "Isostatic Press Devices and Processes for Cylindrical Solid-State Batteries," filed on May 14, 2019. U.S. patent application Ser. No. 16/412,338 is related to U.S. patent application Ser. No. 16/217,002, entitled "Hydraulic Isotropically-Pressurized Battery Modules," filed on Dec. 11, 2018 and U.S. patent application Ser. No. 16/217,010, entitled "Hydraulic Isostatic Press Processes for Solid-State Batteries", filed on Dec. 11, 2018, the entire disclosures of which are hereby incorporated by reference for all purposes.

BACKGROUND

Certain types of battery cells function more effectively when a significant amount of pressure has been applied to each battery cell prior to installation in a device which will be powered by the battery cell. The pressure may increase the amount of surface area in contact between an anode, a separator layer, and/or cathode or the pressure may increase the amount of surface area contact between an anode, an electrolyte, and/or a cathode. Such pressure may be applied as part of a manufacturing process.

SUMMARY

Various arrangements for compressing a cylindrical battery cell are presented herein. The cylindrical battery cell may be wrapped in a buffer material. The buffer material may have a halo-shaped cross-section. The buffer material may be compressed using a compression mechanism. A first edge of the compression mechanism may be moved toward a second edge of the compression mechanism, thereby decreasing a volume of a first cylindrical void within the compression mechanism. The buffer material may uniformly distribute pressure applied to the buffer material to a curved sidewall of the cylindrical battery cell. The cylindrical battery cell may be heated, using a heating element, while the buffer material is being compressed using the compression mechanism. The compression mechanism may then be disengaged. After disengaging the compression mechanism, the cylindrical battery cell may be removed from the buffer material, whereby the cylindrical battery cell is now a semi-activated cylindrical battery cell.

Embodiments of such a cylindrical battery cell may include one or more of the following features: Compressing the buffer material using the compression mechanism may include an extension of the compression mechanism being actuated by a user to apply force. A temperature sensor may be installed between the buffer material and the cylindrical battery cell. Heating of the cylindrical battery cell may be controlled based on temperature measurements made using the temperature sensor. The heating element may be located between the compression mechanism and the buffer material. The cylindrical battery cell may be a jelly-roll style solid-state battery cell. The buffer material may be compressed using a pressure of between 0.1-10 MPa being applied to an outer perimeter of the buffer material. Heating the cylindrical battery cell may include the heating element heating to between 60° C. and 250° C.

In some embodiments, a cylindrical battery press system is present. A jelly-roll style solid-state cylindrical battery cell may be present. The system can include a compression mechanism that, when engaged, causes a first edge of the compression mechanism to be moved toward a second edge of the compression mechanism, thereby decreasing a volume of a first cylindrical void within the compression mechanism. The system can include a semi-rigid buffer material having a halo-shaped cross-section, the semi-rigid buffer material being installed within the first cylindrical void of the compression mechanism. The semi-rigid buffer material may define a second cylindrical void within which the jelly-roll style solid-state cylindrical battery cell is installed. The system can include a heating element that wraps around at least a portion of an outer perimeter of the semi-rigid buffer material and is configured to output heat while the compression mechanism is engaged. The system can include a support structure, wherein the second edge of the compression mechanism is anchored to the support structure such that the second edge does not move relative to the support structure when the compression mechanism is engaged. In some embodiments, the compression mechanism includes an extension to be actuated by a user, wherein the extension causes force to be applied to the compression mechanism to move the first edge of the compression mechanism toward the second edge of the compression mechanism.

DETAILED DESCRIPTION

Certain types of battery cells may benefit from having pressure and heat applied during or after the manufacturing process prior to installation in a system to be powered using the battery cells. The application of pressure and heat may help increase the amount of surface in contact between the anode, solid electrolyte, and cathode of a solid-state battery cell or the anode, separator, and cathode of a battery cell.

A battery cell may be a jelly-roll style battery cell. A jelly-roll battery cell is made of multiple, flexible layers, which are layered together then rolled into a cylindrical shape. The rolled layers of the jelly-roll style battery cell may then be inserted into a cylindrical housing and contacts with the anode and cathode may be added. The cylindrical housing may a flexible pouch. The pouch may not be rigid, therefore pressure applied to external surfaces of the pouch may be transferred to the internal layers. For non-solid-state batteries, a liquid or gel electrolyte may be added to the cylindrical housing and absorbed into the anode, cathode, and separation layers.

Once the battery cell has been rolled and inserted into the pouch, pressure and heat may be applied to the battery cell to increase the amount of surface area contact between the rolled layers of the battery cell. Pressure and heat may be applied to the curved surface of the cylindrical pouch. Pressure and heat may not be applied to the bases (or ends) of cylindrical pouch.

A cylindrical battery press system may be used that uniformly or nearly uniformly distributes pressure along the curved sidewall of a cylindrical pouch battery cell. While the pressure is being applied, the system may also apply heat. For instance, while a pressure between 0.1-10 MPa is being applied by the system to the curved sidewall of the cylindrical battery pouch, the pouch may be heated to 100° C. or greater. The system may uniformly or nearly uniformly distribute pressure and heat onto the cylindrical sidewall of the battery cell without using a liquid to distribute the heat and pressure. Rather, a buffer material, which may be a heat-resistant rubber, may serve as an interface between a compression mechanism and the battery cell. This buffer material may help evenly distribute the pressure and heat to the battery cell. By not using a liquid to distribute the heat and pressure, it may be easier to insert, remove, and clean (if needed at all) the battery cell. When a liquid is used, the external surface of the battery cell may need to be dried thoroughly. Further, in systems that use liquid, the liquid may need to be cleaned, replaced, or replenished occasionally.

Figure 1:
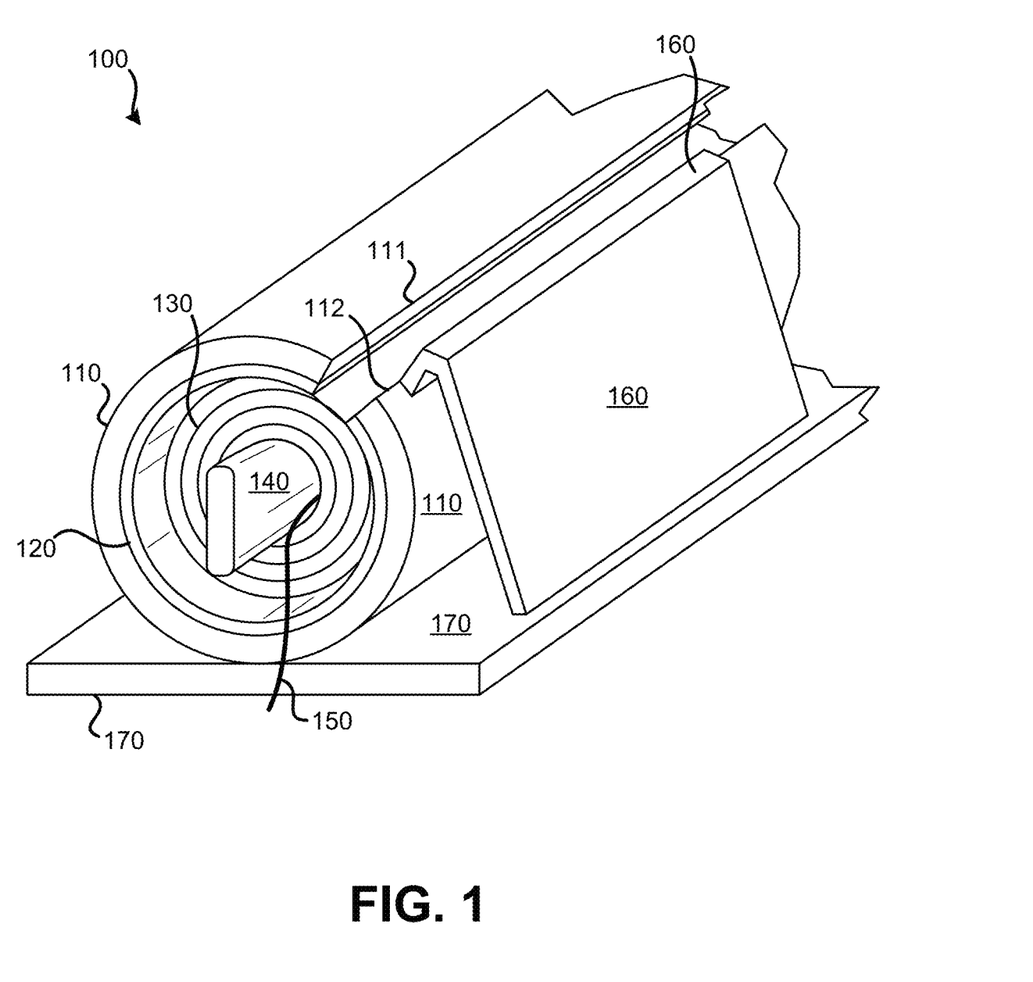
FIG. 1 illustrates an embodiment of a cylindrical battery press system.

Additional detail regarding cylindrical battery press systems is provided in relation to the figures. FIG. 1 illustrates an embodiment of a cylindrical battery press system 100. Cylindrical battery press system 100 can include: compression mechanism 110; heating element 120; buffer material 130; cylindrical pouch battery cell (also referred to as "battery cell") 140; temperature sensor 150; support structure 160; and platform 170.

Compression mechanism 110 may be approximately cylindrical in shape and have a cross-section that is similar to a halo. A gap along the curved sidewall of compression mechanism 110 may be present. On either side of this gap is edge 111 and edge 112. By edge 111 being moved toward edge 112, the volume within compression mechanism 110 may be decreased. Therefore, when edge 111 is away from edge 112, the volume within compression mechanism is larger, allowing buffer material and/or battery cell 140 to be installed. When edge 111 is toward edge 112, the volume within compression mechanism 110 is smaller, thus applying pressure to buffer material 130 and, through buffer material 130, to battery cell 140.

Compression mechanism 110 may be formed from a semi-rigid material, such as a hard rubber, plastic, or a layer of metal. Compression mechanism 110 may be partially deformed by edge 111 being pushed or pulled toward edge 112. In some embodiments, edge 112 may be fixed to support structure 160. Edge 111 may be connected with an extension, such as a metal bar, that allows a user to manually push or pull the metal bar to move edge 111 toward edge 112. In other embodiments, a hydraulic pump or electric motor may be used to move edge 111 toward edge 112.

Buffer material 130 may be wrapped around battery cell 140. Buffer material 130 may be a semi-rigid material, such as heat resistant rubber. In some embodiments, buffer material 130 may be a rubber or other form of flexible skin that is filled with liquid. Buffer material 130, when viewed as a cross-section, may generally be halo-shaped. This halo shape defines a void within its center, into which a battery cell can be placed. Buffer material 130 may serve to transfer pressure applied by compression mechanism 110 to battery cell 140. Buffer material 130 may help distribute the pressure applied by compression mechanism 110 such that the pressure applied to the curved sidewall of battery cell 140 is uniform or nearly uniform. In some embodiments, buffer material 130 is first wrapped around battery cell 140. In some embodiments, buffer material 130 may be a sheet of buffer material in which battery cell is rolled. Therefore, the jelly-roll style battery cell may, in turn, be within a jelly-roll of buffer material. Buffer material 130 may be installed with compression mechanism 110.

Between buffer material 130 and compression mechanism 110, heating element 120 may be present. Heating element 120 may be generally cylindrical in shape and may have a gap along the curved sidewall that matches the gap of compression mechanism 110. Heating element 120 may be a resistive heater such that when current is applied to heating element 120, heat is generated. In some embodiments, heating element 120 is capable of heating up to 250° C. The amount of heat output by heating element 120 may be controlled based on the output of temperature sensor 150. Temperature sensor 150 may be located between battery cell 140 and buffer material 130. Therefore, temperature sensor 150 may indicate the temperature at an external surface of battery cell 140. In some embodiments, it may be desirable for battery cell 140 to be heated to 100° C. By applying a greater temperature using heating element 120, it may be possible for battery cell 140 to be heated to 100° C. at its surface quicker. An external heating controller (not pictured) may receive temperature measurements from temperature sensor 150 and control the amount of heat generated by heating element 120.

While edge 112 is fixed to support structure 160, which is in turn fixed to platform 170, edge 111 may remain free. By edge 111 remaining free from support structure 160 and platform 170, edge 111 may be moved toward edge 112, thus slightly deforming compression mechanism 110. When force is ceased to be applied to edge 111, compression mechanism 110 may expand back to a natural shape and pressure may cease being applied to battery cell 140. It should be understood that the force applied to edge 111 may be applied in the vicinity of edge 111 and not necessarily precisely on edge 111. However, the closer such force is applied to edge 111, the more evenly distributed the pressure applied to buffer material 130 may be. Similarly, it should be understood that edge 112 can be directly fixed to support structure 160, but rather a portion of compression mechanism 110 in a vicinity of edge 112 may be fixed to support structure 160. Again here, the portion of compression mechanism 110 to edge 112 fixed to support structure 160, the more evenly distributed the pressure applied to buffer material 130 may be.

Battery cell 140 may be a solid-state battery. The electrolyte layer used may be a Li-ion-conductive polymer, or sulfur/oxide based solid-state electrolyte. The power density of a battery cell that uses such an electrolyte may be increased by a large amount of contact being present between the electrolyte, the anode, and the cathode. In other embodiments, a different type of battery cell 140 may be used.

Figure 2:
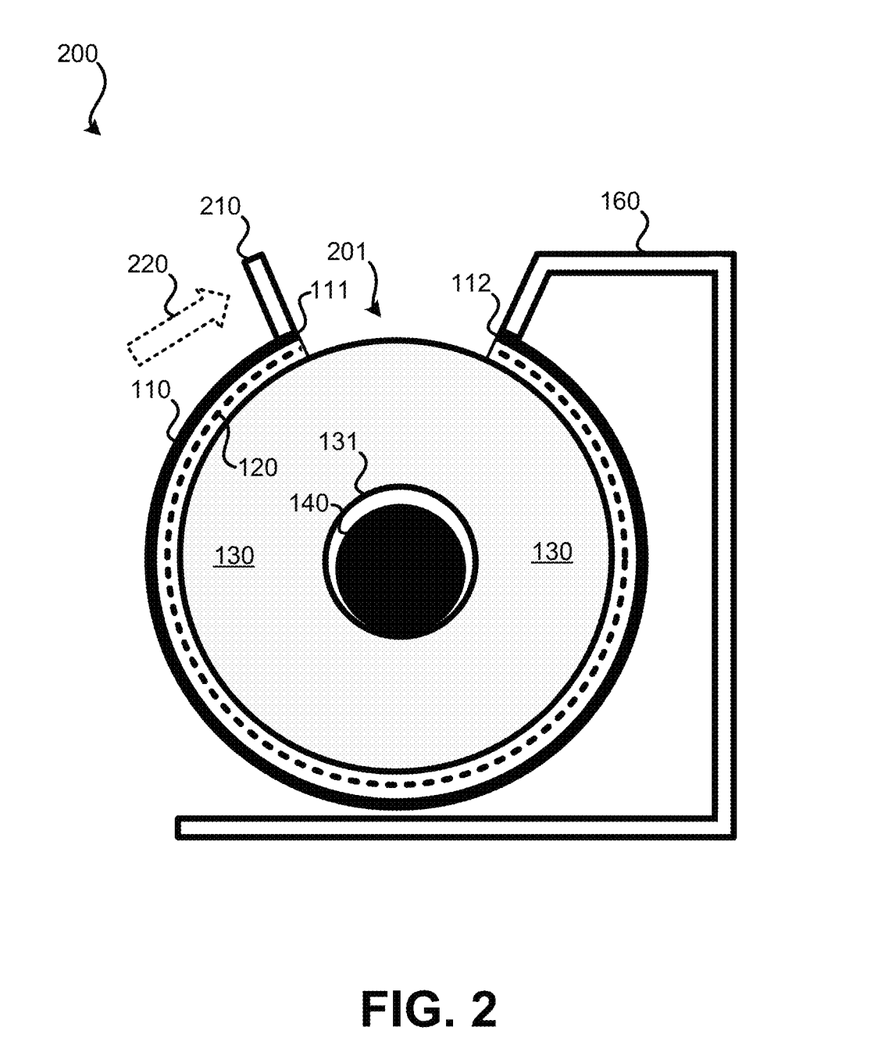
FIG. 2 illustrates an embodiment of a cross-section of a disengaged cylindrical battery press system.

FIG. 2 illustrates an embodiment of a cross-section 200 of a disengaged cylindrical battery press system. Cross-section 200 can represent a cross-section of cylindrical battery press system 100 of FIG. 1. Cross-section 200 represents an embodiment in which compression mechanism 110 is disengaged. That is, little or no pressure is being applied by compression mechanism 110 to buffer material 130. Heating element 120 may be disengaged. Gap 201 is larger (relative to in FIG. 3) due to no force being applied to extension 210.

As can be seen in FIG. 2, there may be a slight air gap present between battery cell 140 and inner surface 131 of buffer material 130. Force 220 may be applied by a user pushing or pulling extension 210 toward edge 112. In other embodiments, a hydraulic system or electric motor may apply force to extension 210 or some other connection with compression mechanism 110.

Figure 3:
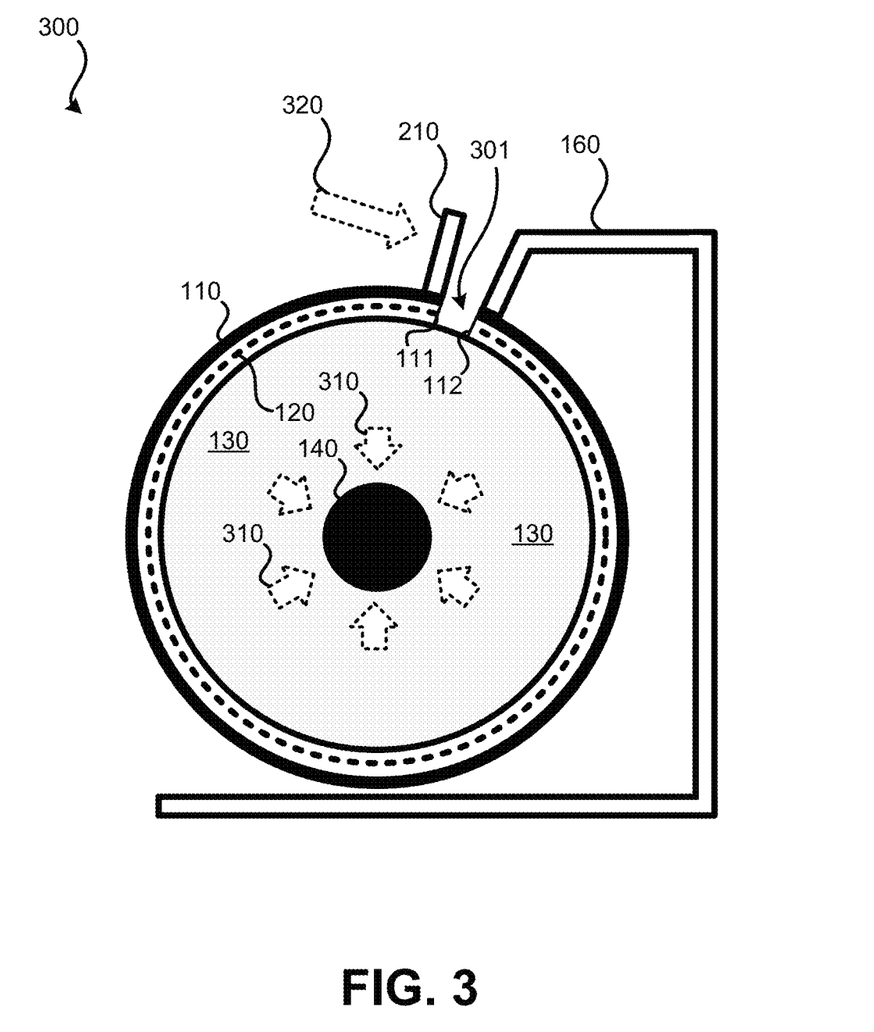
FIG. 3 illustrates an embodiment of a cross-section of an engaged cylindrical battery press system.

FIG. 3 illustrates an embodiment of a cross-section 300 of an engaged cylindrical battery press system. Cross-section 300 can represent a cross-section of cylindrical battery press system 100 of FIG. 1. Cross-section 300 can represent the embodiment of FIG. 2 when force is being applied to extension 210. Cross-section 300 represents an embodiment in which compression mechanism 110 is engaged. That is, pressure, such as between 0.1-10 MPa is being applied by compression mechanism 110 to buffer material 130. Heating element 120 may be outputting heat, such as between 60° C.-250° C. Gap 301 is smaller (relative to gap 201 in FIG. 2) due to the force being applied to extension 210.

In cross-section 300, extension 210 is moved by force 320 such that edge 111 is closer to edge 112. This movement causes a decrease within a volume inside of compression mechanism 110. Compression mechanism 110, through heating element 120, applies pressure along an outer perimeter of buffer material 130. Buffer material 130 transfers this pressure, in an approximately uniform distribution indicated by pressure arrows 310, to battery cell 140. Therefore, battery cell 140 is being squeezed on an entirety of its curved cylindrical sidewall by buffer material 130. The closer that edge 111 is moved toward edge 112, the greater the amount of pressure that may be created on buffer material 130 and, thus, the greater the amount of pressure exerted on the curved sidewall of battery cell 140.

While pressure is being applied to battery cell 140, heat may be output by heating element 120 and transferred to battery cell 140 via buffer material 130. An outer perimeter of buffer material 130 may be heated to a significantly higher temperature than to which battery cell 140 is to be heated to heat battery cell 140 quicker.

Figure 4:
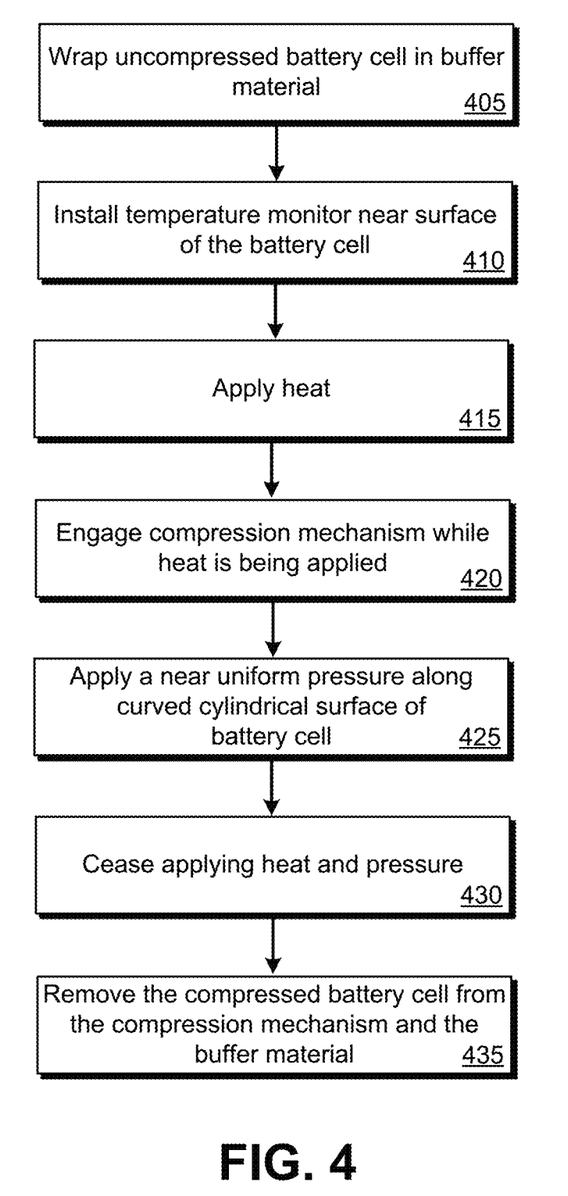
FIG. 4 illustrates an embodiment of a method for using a cylindrical battery press system to compress a cylindrical battery cell.

Various methods may be performed using the systems detailed in relation to FIGS. 1-3. FIG. 4 illustrates an embodiment of a method 400 for using a cylindrical battery press system to compress a cylindrical battery cell. Method 400 may be performed using the system of FIGS. 1-3. At block 405, a pouch-style battery cell that is generally cylindrical in shape may be wrapped in a buffer material. The battery cell may be a solid state battery that has been put into a jelly-roll shape by rolling the sheets of the battery cell together. To activate the battery cell, the battery cell may need to be pressed and heated to increase the amount of contact between the anode, cathode, and solid-state electrode. In some embodiments, the buffer material is a heat-resistant rubber. The buffer material may be in the form of a flexible sheet in which the buffer material can be rolled. In other embodiments, the battery cell may be slid into the buffer material, which is already in the form of a cylinder with a center void to accommodate the battery cell.

At block 410, a temperature monitor may be installed near the surface of the battery cell. The temperature monitor may be wrapped in the buffer material while the battery cell is being wrapped. Alternatively, the temperature monitor may be slid between the battery cell and the buffer material after the battery cell has been wrapped or inserted in the buffer material. In still other embodiments, the temperature monitor may be placed along an exposed base of the cylindrical battery cell such that the temperature monitor is not between the buffer material and the curved sidewall of the cylindrical battery cell.

At block 415, a heating element may be activated to apply heat. In some embodiments, block 420 is performed either concurrently or before block 415. The amount of heat applied may be controlled by measurements taken using s temperature monitor. In some embodiments, it may be desired to heat a surface of the battery cell to between 60° C.-150° C. To do this, the heating element may be heated to between 60° C.-250° C. The heating element may evenly heat the buffer material such that the heat is transferred uniformly or nearly uniformly to the curved sidewall of the cylindrical battery cell.

At block 420, the compression mechanism may be engaged. Engagement of the compression mechanism can, in some embodiments, trigger the heating element to heat. In some embodiments, block 415 is performed concurrently or after block 420. Engagement of the compression mechanism may be performed by a user manually pushing or pulling a bar or other form of extension attached to the compression mechanism. For instance, referring to FIG. 2, extension 210 may be rotated clockwise toward edge 112. This movement may cause the internal volume of the compression mechanism to be decreased. This decrease in volume will cause pressure to start being exerted, approximately uniformly, on the curved outer surface of the buffer material. In some embodiments, rather than a user applying force manually, a motor, engine, or hydraulic system may engage the compression mechanism. Since the heating element is located between the compression mechanism and the buffer material, engagement of the compression mechanism may increase the amount of contact between buffer material and the heating element. In some embodiments, a latch may be present such that once the compression mechanism is engaged, the latch can be engaged to hold the compression mechanism in an engaged position.

At block 425, as the compression mechanism is engaged and squeezes the buffer material, the buffer material may further uniformly distribute the compressive pressure to the cylindrical pouch-style battery cell. The battery cell may be squeezed with a pressure, such as between 0.1-10 MPa around the entirety of its curved sideway (but not at each of its bases). While the pressure is being applied, heat may be uniformly or nearly uniformly transferred to the battery cell through the buffer material. The heat may be controlled by a temperature controller based on temperature measurements made by the temperature monitor. The pressure of block 425 may continue to be applied for an amount of time, such as between 30 seconds and 5 minutes.

At block 430, pressure and heat may cease being applied. The compression mechanism may be disengaged such that pressure ceases to be applied to the buffer material by the compression mechanism, and thus, pressure ceases being transferred to the battery cell. In some embodiments, the extension may be rotated counterclockwise or may cease having force applied to a clockwise direction. In some embodiments, a latch that is holding the compression mechanism in an engaged position may be released. The heating element may stop outputting heat as part of block 430.

At block 435, the compressed battery cell may be removed from the compression mechanism. If the compressed battery cell is wrapped within the buffer material, the buffer material may be unrolled or unwrapped such that the battery can be retrieved. In other embodiments, the battery cell may be slid out of the cylindrical void at the center of the buffer material. The process of method 400 may then be performed on another uncompressed battery cell. This compressed battery cell may now be considered "semi-activated." To be fully activated, the battery cell may need to be installed in a battery module that will provide at least some amount of pressure (greater than atmospheric pressure) and/or some amount of heat (greater than the ambient temperature).

The semi-activated battery may be installed within a sealable housing in which the battery cell is to be charged and discharged. This housing is separate and distinct from the compression system used for method 400. The housing may function as part of a battery module. Such a sealable housing may be located on-board a vehicle. Once the battery cell has been installed within the sealable housing, the sealable housing may be sealed with the battery cell. Liquid, such as oil, may be present within the sealable housing such that all or most of the space surrounding the battery cell is occupied by liquid. After the battery cell is inserted into the housing, the amount of liquid within the sealable housing may be topped off or all of the liquid may be added.

The liquid within the housing may be pressurized, such as using a pump. Once the liquid has been pressurized to the desired pressure, the sealable housing may be sealed, possibly permanently. The battery cell may now be considered activated. As such, the pressure may be retained by virtue of the sealable housing preventing the pressure from escaping. The pressure created may be less pressure than the pressure applied at block 420 of method 400. Similarly, the liquid within the housing may be heated, such as using one or more heating elements. The heat created may be less than the heat applied at block 415 such that the operating temperature is below the temperature at which the battery was activated at block 415. Heat may be applied to keep the battery within a desired temperature operating range.

The activated battery cell may then undergo charge and discharge cycles, such that the activated battery cell, which is within the isotropic pressurized environment, creates electricity that can be used to power a system or device, such as an electric vehicle.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A cylindrical battery press system, comprising:
   a compression mechanism that, when engaged, causes a first edge of the compression mechanism to be moved toward a second edge of the compression mechanism, thereby decreasing a volume of a first cylindrical void within the compression mechanism; and
   a buffer material having a halo-shaped cross-section, the buffer material being installed within the first cylindrical void of the compression mechanism, wherein the buffer material defines a second cylindrical void within which a battery cell is configured to be installed.

2. The cylindrical battery press system of claim 1, wherein the buffer material is semi-rigid.

3. The cylindrical battery press system of claim 1, wherein the compression mechanism comprises an extension to be actuated by a user, wherein the extension causes force to be applied to the compression mechanism to move the first edge of the compression mechanism toward the second edge of the compression mechanism.

4. The cylindrical battery press system of claim 1, further comprising:
   a support structure, wherein the second edge of the compression mechanism is anchored to the support structure such that the second edge does not move relative to the support structure when the compression mechanism is engaged.

5. The cylindrical battery press system of claim 1, further comprising:
   a temperature sensor configured to be inserted in the second cylindrical void between the battery cell and the buffer material.

6. The cylindrical battery press system of claim 2, wherein the buffer material is heat-resistant rubber.

7. The cylindrical battery press system of claim 1, wherein the buffer material uniformly redistributes pressure applied by the compression mechanism to the battery cell when the battery cell is installed within the second cylindrical void.

8. The cylindrical battery press system of claim 1, further comprising a jelly-roll style pouch battery, wherein the jelly-roll style pouch battery is installed with the second cylindrical void.

9. The cylindrical battery press system of claim 1, wherein the compression mechanism applies between 0.1 and 10 megapascals (MPa) of pressure to the buffer material.

10. The cylindrical battery press system of claim 1, further comprising:
    a heating element that wraps around at least a portion of an outer perimeter of the buffer material and is configured to output heat while the compression mechanism is engaged.

11. The cylindrical battery press system of claim 10, wherein the heating element heats to between 60° C. and 250° C.

12. The cylindrical battery press system of claim 1, wherein the compression mechanism comprises a motor that causes force to be applied to the compression mechanism to move the first edge of the compression mechanism toward the second edge of the compression mechanism.

13. A method for compressing a cylindrical battery cell, the method comprising:
- wrapping the cylindrical battery cell in a buffer material, wherein the buffer material has a halo-shaped cross-section;
- after wrapping the cylindrical battery cell in the buffer material, compressing the buffer material using a compression mechanism, wherein:
  - a first edge of the compression mechanism is moved toward a second edge of the compression mechanism, thereby decreasing a volume of a first cylindrical void within the compression mechanism; and
  - the buffer material uniformly distributes pressure applied to the buffer material to a curved sidewall of the cylindrical battery cell;
- disengaging the compression mechanism; and
- after disengaging the compression mechanism, removing the cylindrical battery cell from the buffer material.

14. The method for compressing the cylindrical battery cell of claim 13, wherein compressing the buffer material using the compression mechanism comprises an extension of the compression mechanism being actuated by a user to apply force.

15. The method for compressing the cylindrical battery cell of claim 13, further comprising:
- installing a temperature sensor between the buffer material and the cylindrical battery cell.

16. The method for compressing the cylindrical battery cell of claim 15, further comprising:
- controlling heating of the cylindrical battery cell based on temperature measurements made using the temperature sensor.

17. The method for compressing the cylindrical battery cell of claim 16, wherein a heating element is located between the compression mechanism and the buffer material.

18. The method for compressing the cylindrical battery cell of claim 17, wherein heating the cylindrical battery cell comprises the heating element heating to between 60° C. and 250° C.

19. The method for compressing the cylindrical battery cell of claim 13, wherein compressing the buffer material comprises a pressure of between 0.1-10 MPa being applied to the buffer material.

20. A cylindrical battery press system, comprising:
- a jelly-roll style solid-state cylindrical battery cell;
- a compression mechanism that, when engaged, causes a first edge of the compression mechanism to be moved toward a second edge of the compression mechanism, thereby decreasing a volume of a first cylindrical void within the compression mechanism;
- a semi-rigid buffer material having a halo-shaped cross-section, the semi-rigid buffer material being installed within the first cylindrical void of the compression mechanism, wherein the semi-rigid buffer material defines a second cylindrical void within which the jelly-roll style solid-state cylindrical battery cell is installed; and
- a support structure, wherein the second edge of the compression mechanism is anchored to the support structure such that the second edge does not move relative to the support structure when the compression mechanism is engaged.

* * * * *